United States Patent
Bailey et al.

(10) Patent No.: US 11,211,807 B1
(45) Date of Patent: Dec. 28, 2021

(54) BATTERY POWER MANAGEMENT DEVICE AND ASSOCIATED METHOD OF USE

(71) Applicant: Intellitec Products LLC, Deland, FL (US)

(72) Inventors: David F. Bailey, Riverview, FL (US); Edward A. Schiff, St. Petersburg, FL (US); John A. Ciambriello, Deland, FL (US); Jeff Caudill, Lake Zurich, IL (US)

(73) Assignee: Intellitec Products LLC, Deland, FL (US)

( * ) Notice: Subject to any disclaimer, the term of this patent is extended or adjusted under 35 U.S.C. 154(b) by 0 days.

(21) Appl. No.: 16/811,818

(22) Filed: Mar. 6, 2020

Related U.S. Application Data

(60) Provisional application No. 62/814,561, filed on Mar. 6, 2019.

(51) Int. Cl.

| | |
|---|---|
| *H02J 7/00* | (2006.01) |
| *B60L 50/60* | (2019.01) |
| *B60L 8/00* | (2006.01) |
| *B60L 50/71* | (2019.01) |
| *H02J 7/35* | (2006.01) |
| *B60L 58/12* | (2019.01) |

(52) U.S. Cl.
CPC ............ *H02J 7/0063* (2013.01); *B60L 8/003* (2013.01); *B60L 50/66* (2019.02); *B60L 50/71* (2019.02); *B60L 58/12* (2019.02); *H02J 7/0048* (2020.01); *H02J 7/35* (2013.01); *B60L 2240/547* (2013.01); *B60L 2240/549* (2013.01)

(58) Field of Classification Search
CPC . H02J 7/0063; H02J 7/35; B60L 50/66; B60L 58/12; B60L 50/71; B60L 8/003; B60L 2240/547; B60L 2240/549
See application file for complete search history.

(56) References Cited

U.S. PATENT DOCUMENTS

| | | | |
|---|---|---|---|
| 4,499,385 A | 2/1985 | Slavik | |
| 4,617,472 A | 10/1986 | Slavik | |
| 7,741,733 B1 | 6/2010 | Slavik | |
| 2018/0099579 A1* | 4/2018 | Hale | G05F 1/462 |
| 2019/0052119 A1* | 2/2019 | Hendrix | B60L 58/12 |
| 2019/0143838 A1* | 5/2019 | Sun | H01M 10/486 |
| | | | 320/124 |

* cited by examiner

*Primary Examiner* — Jared Fureman
*Assistant Examiner* — Duc M Pham
(74) *Attorney, Agent, or Firm* — Molly L. Sauter; Smith & Hopen, P.A.

(57) ABSTRACT

A battery power management system for vehicles and vessels requiring switching devices to disconnect mounted batteries from unit loads utilizing rules based logic. The battery power management system controls the switching devices to prevent over-discharging and over-charging of the batteries and to prevent excessive current drain. The battery power management system utilizes various timing parameters to coordinate connection and disconnection attempts and provides status information regarding the current state of protection of the batteries.

19 Claims, 3 Drawing Sheets

BATTERY POWER MANAGEMENT DEVICE AND ASSOCIATED METHOD OF USE

CROSS-REFERENCE TO RELATED APPLICATIONS

This application claims priority to currently U.S. Provisional Patent Application No. 62/814,561, filed Mar. 6, 2019 and entitled "Battery Power Management Device and Associated Method of Use", which is hereby incorporated in its entirety.

FIELD OF THE INVENTION

This invention relates generally, to control of batteries for operating electrical equipment on motor homes, boats, or other vehicles where DC power is being used.

BACKGROUND OF THE INVENTION

Batteries are commonly used to operate the electrical equipment in vehicles and vessels. Commonly, a first battery is used primarily for engine functions and a second is used for auxiliary functions. In an ideal installation, all of the batteries are charged when any one of them is being charged. Moreover, the batteries are isolated from one another when no battery is being charged to prevent one load from discharging more than one battery. The batteries are also ideally disconnected from any loads when the vehicle is put into storage to prevent extraneous loads from inadvertently discharging the batteries. To implement the battery management requirements, the vehicles and vessels typically employ a power management system which includes switching devices to disconnect the mounted batteries from the unit loads to allow for manual control and to prevent excessive battery discharging and charging.

However, the battery power management systems currently known in the art suffer from poor battery management techniques, over-discharging and over-charging, lack of effective power management, excessive current draining, lack of coordination among device connection and disconnections and absence of status information on the state of protection of the batteries.

Thus, there is a need for an apparatus that improves the monitoring and connection management of the multiple batteries present in vehicles and vessels having multiple batteries.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved battery power management device is now met by a new, useful, and non-obvious invention.

In various embodiments, the present invention provides a battery power management system for connecting and disconnecting mounted batteries in vehicles and vessels, thereby providing manual and automatic switching of loads and power sources to the batteries. The battery power management device implements rules based logic to control electrical high current switches and electrical low current switches to assist in managing the various battery connections and disconnections. The battery power management system of the present invention successfully unifies battery power management with load switching, measuring, monitoring, and battery and power source condition notifications.

In one embodiment, the present invention provides a DC power management system which includes at least two load switches, each of the at least two load switches to connect one or more DC power sources to one or more loads and to disconnect the one or more DC power sources from the one or more loads. The system further includes, a microcontroller in communication with the at least two load switches, the microcontroller to control the at least two load switches to connect or disconnect the one or more DC power sources to the one or more loads. The system further includes, at least one sensor interface of the microcontroller, the at least one sensor interface to receive one or more operating parameters of each of the one or more DC power sources and a memory unit for storing operating parameter threshold values for each of the one or more DC power sources. As such, the microcontroller controls the at least two load switches to connect the one or more DC power sources to the one or more loads and to disconnect the one or more DC power sources from the one or more loads based upon the one or more operating parameters of each of the one or more power sources received at the at least one sensor interface of the microcontroller and the operating parameter threshold values for each of the one or more DC power sources.

The one or more DC power sources may be selected from batteries, solar panels and fuel cells.

In a particular embodiment, the system includes at least one a high current load switch having a high current capacity and at least one low current load switch having a low current capacity, and a low voltage threshold of the at least one high current load switch is higher than a low voltage threshold of the at least one low current load switch.

The DC power management system may further include a network interface circuitry in communication with network interface cabling coupled to a plurality of networked devices. The network interface cabling may include segmented power distribution, wherein the microcontroller controls the segmented power distribution to provide power independently to at least two segments of the network interface cabling.

In an additional embodiment, the present invention provides a method for controlling one or more DC power sources. The method includes, coupling a DC power management system to at least two load switches, wherein the DC power management system comprises, at least two load switches, each of the at least two load switches to connect one or more DC power sources to one or more loads and to disconnect the one or more DC power sources from the one or more loads, a microcontroller in communication with the at least two load switches, the microcontroller to control the at least two load switches to connect or disconnect the one or more DC power sources to the one or more loads, at least one sensor interface of the microcontroller, the at least one sensor interface to receive one or more operating parameters of each of the one or more DC power sources and a memory unit for storing operating parameter threshold values for each of the one or more DC power sources. The method further includes controlling, by the DC power management system, the at least two load switches to connect the one or more DC power sources to the one or more loads and to disconnect the one or more DC power sources from the one or more loads based upon the one or more operating parameters of each of the one or more power sources received at the at least one sensor interface of the microcontroller and the operating parameter threshold values for each of the one or more DC power sources.

Accordingly, the present invention provides an apparatus and method that improves the monitoring and connection management of the multiple batteries present in vehicles and vessels having multiple batteries. The present invention additional provides a segmented network interface to supply different power levels to different devices attached to the network interface device. Accordingly, in various embodiments, the present invention provides additional functionality not previously available to vehicle and vessel operators, thereby improving the monitoring and connection management of the multiple batteries present in vehicles and vessels having multiple batteries.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

In various embodiments, the present invention provides a DC power management system to disconnect mounted batteries in vehicles and vessels providing manual and automatic switching of loads and power sources to the batteries. The DC power management device of the present invention control electrical high current switches and rules to assist managing disconnections and connections.

Figure 1:
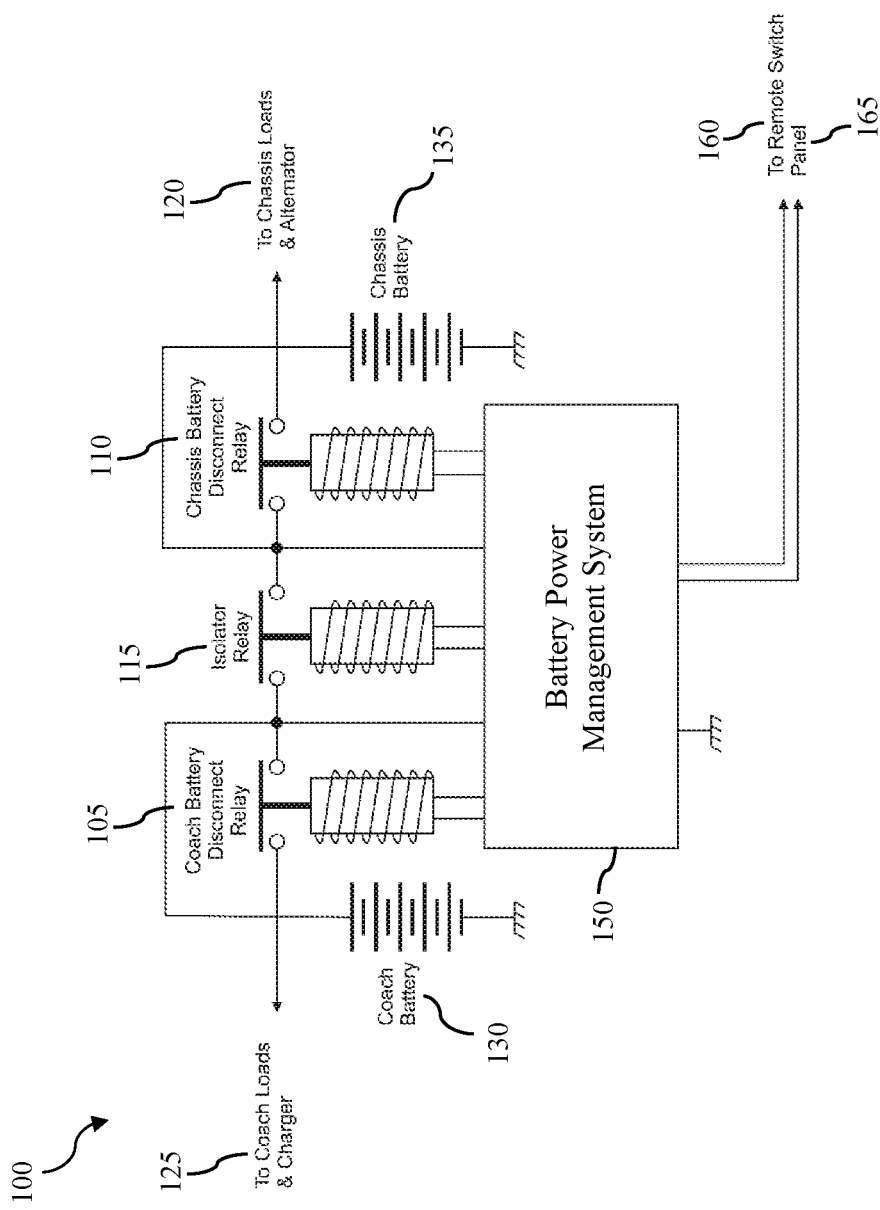
FIG. 1 is a diagrammatic illustration of a system incorporating a battery power management system, in accordance with an embodiment of the present invention.

FIG. 1 illustrates an implementation of the DC power management system 150 of the present invention. In this embodiment, a battery power management system 150 is coupled to a plurality of switching devices 105, 110, 115. As shown, the battery power management system 150 is coupled to an isolator relay 115, a coach battery disconnect relay 105 and a chassis battery disconnect relay 110. The battery power management system 150 may be used to connect and disconnect the auxiliary, or coach, battery 130 to the coach load and the charger 125 using the coach battery disconnect relay 105, to connect and disconnect the chassis battery 135 to the chassis load and alternator 120 through the chassis battery disconnect relay 110 and to connect and disconnect the isolator relay 115 between the coach battery disconnect relay 105 and the chassis battery disconnect relay 110. The current status of the battery connections of the coach battery 130 and the chassis battery 135 may be provided to a display panel 165 and to a remote switch 160.

In various embodiments, the present invention may additionally include a protective enclosure for housing the battery power management system 150. The enclosed battery power management system is portable thereby providing control of batteries for operating electrical equipment on motor homes, boats, or other vehicles where AC power is not always available and DC power is in use.

In the present invention, the switching devices may be embodied as latching solenoids that do not require energy to hold the solenoids in their respective engaged or disengaged positions. However, this type of switching device is not intended to be limiting and other switching devices that can be managed by the battery power management system of the present invention are within the scope of the present invention.

The isolator relay 115 may be initialized by the battery power management system 150 to simultaneously charge both the coach battery 130 and the chassis battery 135 when either of these batteries is being charged and also to provide an auxiliary start function. The battery power management system 150 further includes a low voltage disconnect feature for both the auxiliary battery and the chassis battery to minimize damage that may result from a complete discharge of the battery. Accordingly, when the battery power management system 150 senses a voltage below a predetermined threshold voltage, the system may disconnect either or both of the batteries 130, 135 from their respective loads 125, 120.

Figure 2:
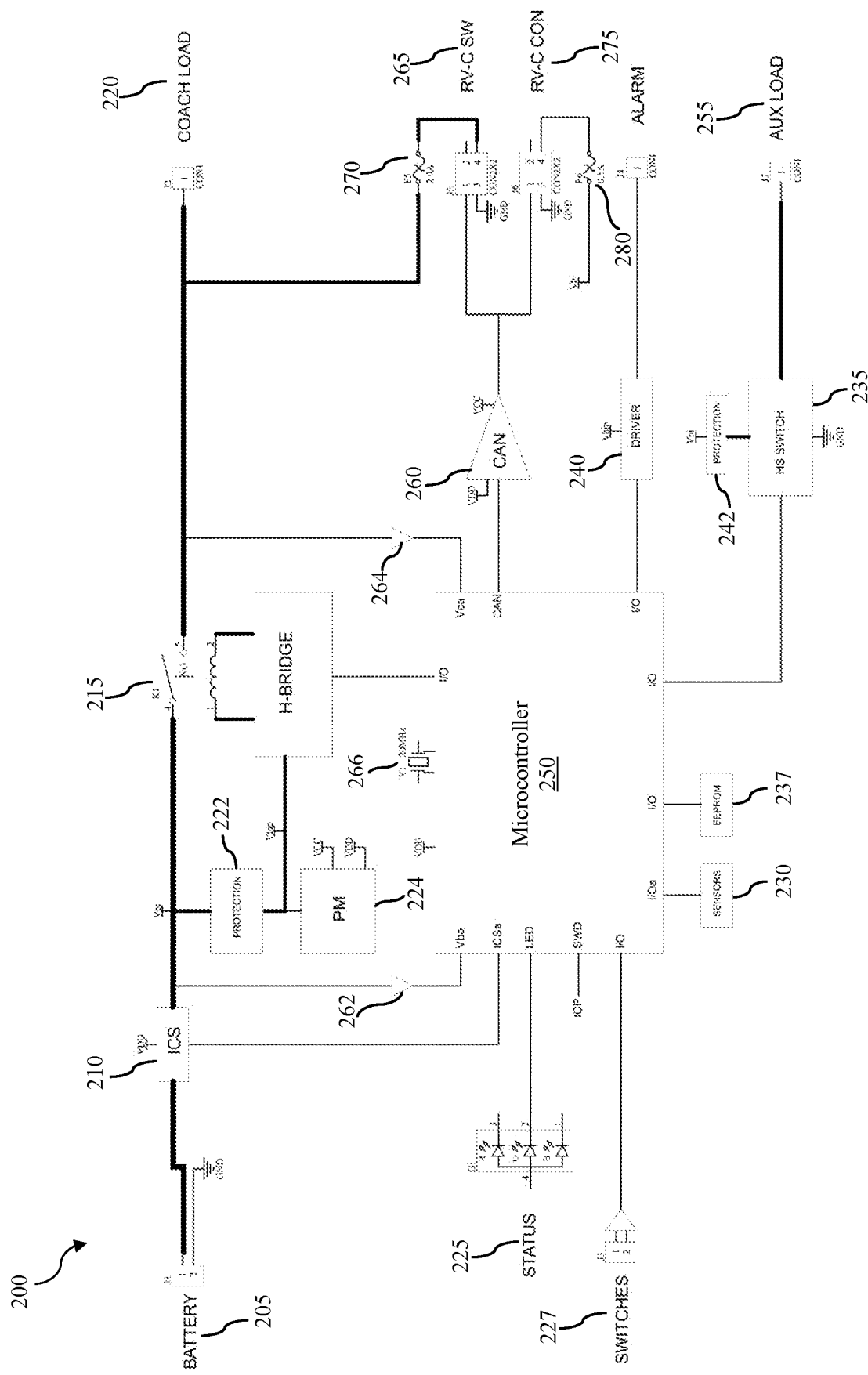
FIG. 2 is a block diagram illustrating the circuit elements of a battery power management system, in accordance with an embodiment of the present invention.

FIG. 2 further illustrates the circuit elements of the battery power management system 200 in accordance with an embodiment of the present invention. As shown, the battery power management system 200 may include at least one microcontroller 250 that is used to control at least two switching devices 215, 235 that are managed by the microcontroller 250 of the battery power management system 200 to connect and disconnect a battery to a coach load 220 or an auxiliary load 255.

The battery power management system 200 provides a battery 205 connection to an isolated current sensor 210 which may be connected and disconnected to a coach load 220 using a high current switch 215, such as a H-Bridge switch. The connection and disconnection between the battery 205 and the coach load 220 is under the control of the microcontroller 250. The microcontroller 250 additionally provides a battery connection to an auxiliary load 255 through a low current switch 235.

In various embodiments, the microcontroller 250 controls the high current switch 215 and the low current switch 235 based upon one or more sensed inputs received from various sensors 230, using rules based logic and threshold values provided by an EEPROM 237 in communication with the microcontroller 250 with precision timing crystal device 266. Various sensors, such as temperature sensors, may additionally be provided to provide temperature data to the microcontroller 250 that will allow the battery power management system to disconnect one or more batteries based upon the temperature data provided by the sensors.

The battery power management system 200 further includes current sensing circuitry 230 for monitoring the current drawn by the one or more loads 220, 255 to provide load current monitoring and overcurrent fault detection. The system 200 may further include power management circuitry for providing overvoltage protection 222, 242 to the switches 215, 235, respectively. Additionally, various LEDs may be driven by the microcontroller 250 to notify the operator of the status 225 of the batteries coupled to the battery power management system 200 and external switches 227 may provide input signals to the microcontroller 250. The microcontroller 250 may additionally be configured to provide a signal to a driver 240 to send an audible alarm to notify the vehicle or vessel operator of a battery fault condition.

The battery power management system 200 additionally includes an Electrically Erasable Programmable Read-Only Memory (EEPROM) 237. The EEPROM 237 is a non-volatile memory device that is commonly integrated into microcontrollers to store relatively small amounts of data, while also allowing individual bytes to be erased and reprogrammed. In the present invention, the EEPROM 235 may store various values that are used by the processor to control the connections to the chassis and auxiliary battery. The EEPROM 237 may be programmed to store threshold parameters for each of the batteries. For example, for each battery 205, the EEPROM 237 may store, an acceptable operating temperature, an acceptable DC voltage range and a low voltage cutoff value, a DC low voltage turn-on differential above cutoff voltage, a DC over voltage cutoff value, a DC voltage turn-on differential below cutoff voltage, a DC operating current standby, a DC operating current idle and an operating current. The EEPROM 237 may additionally store values for controlling the timing of the connections of the batteries, these stored values may include an isolation delay time, a verification with retry attempts value and a minimum voltage threshold requirement to attempt a disconnect from the battery. The EEPROM 237 may also store charging voltage reconnect values, include a charging voltage threshold, a reconnect delay time and a verification with retry attempts value. Alarm output and LED states may also be stored in the EEPROM 237, including values indicating a connected state, a low voltage state, a disconnected state, a failed disconnect state, a failed reconnect state and a below minimum disconnect voltage. A switch input indicating a delay from a previous state change may also be store in the EEPROM 237. In various embodiments, the microcontroller 250 utilizes the values stored in the EEPROM 235 and a set of rules to manage the sequencing of the load switches relevant to timing and voltage levels of the batteries. In addition, the values stored in the EEPROM 237 may be adjusted by erasing and rewriting to the EEPROM 237 as required by future implementations. The rules and thresholds stored in the EEPROM 237 may be remotely configured using wired or wireless communications. One or two way communications may be used for monitoring and configuring. Exemplary electrical specifications and communication specification may include:

| Requirements | Value | Unit |
| --- | --- | --- |
| Low Voltage Battery Disconnect | | |
| Low voltage threshold | 12.1 | V |
| Isolation Delay | 5 | m |
| Verification with retry attempts | 3 | attempts |
| Minimum voltage threshold requirement to attempt disconnect. | | V |
| Charging Voltage Reconnect | | |
| Charging voltage threshold | 13.3 | V |
| Reconnect delay | 1 | m |
| Verification with retry attempts | 3 | attempts |
| Alarm Output and LED | | |
| Connected State | On | N/A |
| Low Voltage State | 1 | Hz |
| Disconnected State | Off | N/A |
| Failed Disconnect State | 1 | Blinks |
| Failed Reconnect State | 2 | Blinks |
| Below minimum disconnect voltage | 3 | Blinks |
| Switch Input | | |
| Delay from previous state change | 5 | s |
| Voltage Monitoring | +/− 0.5% | |
| Current Monitoring | +/− 1.0% | |
| Coil Temperature Monitoring | If possible | |
| Relay State | Open/Closed/Tripped | |
| Tripped Condition Retention | Cause, Time and Condition (V, I, T) | |
| Parallel Switch | 2A, protected | |
| Settings | Low Voltage Trip | |
| | Parallel Switch Trip | |

As additionally shown in FIG. 2, the battery power management system may include connections to a Controller Area Network (CAN) 260 to allow for RV-C communications. RV-C is a communications protocol based on the CAN bus and is commonly used in recreational vehicles to allow communication between components of the system. RV-C can be used for control, coordination, and diagnostics, in a multi-vendor environment. Connections may also be provided to allow for National Marine Electronic Association (NMEA) protocol communications for marine-based vessels. The RV-C and NMEA protocol interfaces can be used to commute details of the battery system to the operator, including, but not limited to, DC battery status, DC load status and DC voltage/current status. In additional to utilizing CAN communication cabling, the present communications within the present invention can also be accomplished using wireless techniques, such as Bluetooth.

As shown in FIG. 2, CAN interface circuitry 260, including but not limited to RV-C CAN interface circuitry, includes current limited power connections for multiple sections of the CAN bus back-bone cabling. The first CAN power connection RV-C SW 275 originates from a battery to provide CAN device operation independent of high current switching device. The second CAN power connection RV-C CON 265 originates from high current switching device to provide power managed CAN device operation. This split CAN bus back-bone cabling will be discussed is discussed in more detail with reference to FIG. 3.

The battery power management system 200 additionally includes power management circuitry 224, in accordance with an embodiment of the present invention. The power management circuitry 225 may include a current sensor, battery voltage measuring circuitry 262, load voltage measuring circuitry 264, temperature sensor, step-down switching regulator and a voltage regulator for controlling the power supplied to the contact switch 215 and for providing protection 222 for the associated circuitry.

The sensing circuitry of the system 200 may include voltage sensing circuitry for monitoring the voltage at each contact of the high current switch 262, 264 to generate a signal proportional to the voltage that is coupled to the microcontroller 250. A current sensor 210 in series with the primary high current switch contact 215 may also be provided to generate a proportional signal to the bidirectional DC current flowing through the switch, which is then coupled to the microcontroller 250. A temperature sensor with circuitry may also be provided to generate a signal proportional to the temperature of the battery management device circuit board, wherein the temperature signal is used to report and determine the battery management device's current ampacity capabilities by the microcontroller 250. A battery state of charge (SOC) may additional be computed by the microcontroller 250, or alternatively, by an external network connected computing device. SOC may be determined by measuring the battery voltage or by aggregating the quality of current flowing in and out of the battery "Coulomb Counting", or by a combination of voltage, current and current aggregation measurements.

In operation of the battery power management system 200, the relay 215 controlling the connection and disconnection of the chassis battery may transition from an idle OFF state to an ON state manually, in response to a command, or automatically in response to the voltage level of the battery being greater than a predetermined first threshold level and dependent upon a timing parameter. The relay 215 may additionally transition from an ON state to an IDLE state in response to a command or automatically in response to the voltage level of the battery falling below the predetermined first threshold level, for diagnostic purposes or based upon a time-out condition. The relay 215 may transition between a manual operating mode and an automatic operating mode based upon commands from the microcontroller 250. Additionally, the switch 235 controlling the auxiliary battery may transition from an idle OFF state to an ON state manually, in response to a command, or automatically in response to the voltage level of the battery begin greater than a predetermined second threshold level and dependent upon a timing parameter. The auxiliary battery may additionally transition from an ON state to an IDLE state in response to a command or automatically in response to the voltage level of the battery falling below the predetermined second threshold level, for diagnostic purposes or based upon a time-out condition. The auxiliary battery may transition between a manual operating mode and an automatic operating mode based upon commands from the microcontroller 250.

Figure 3:
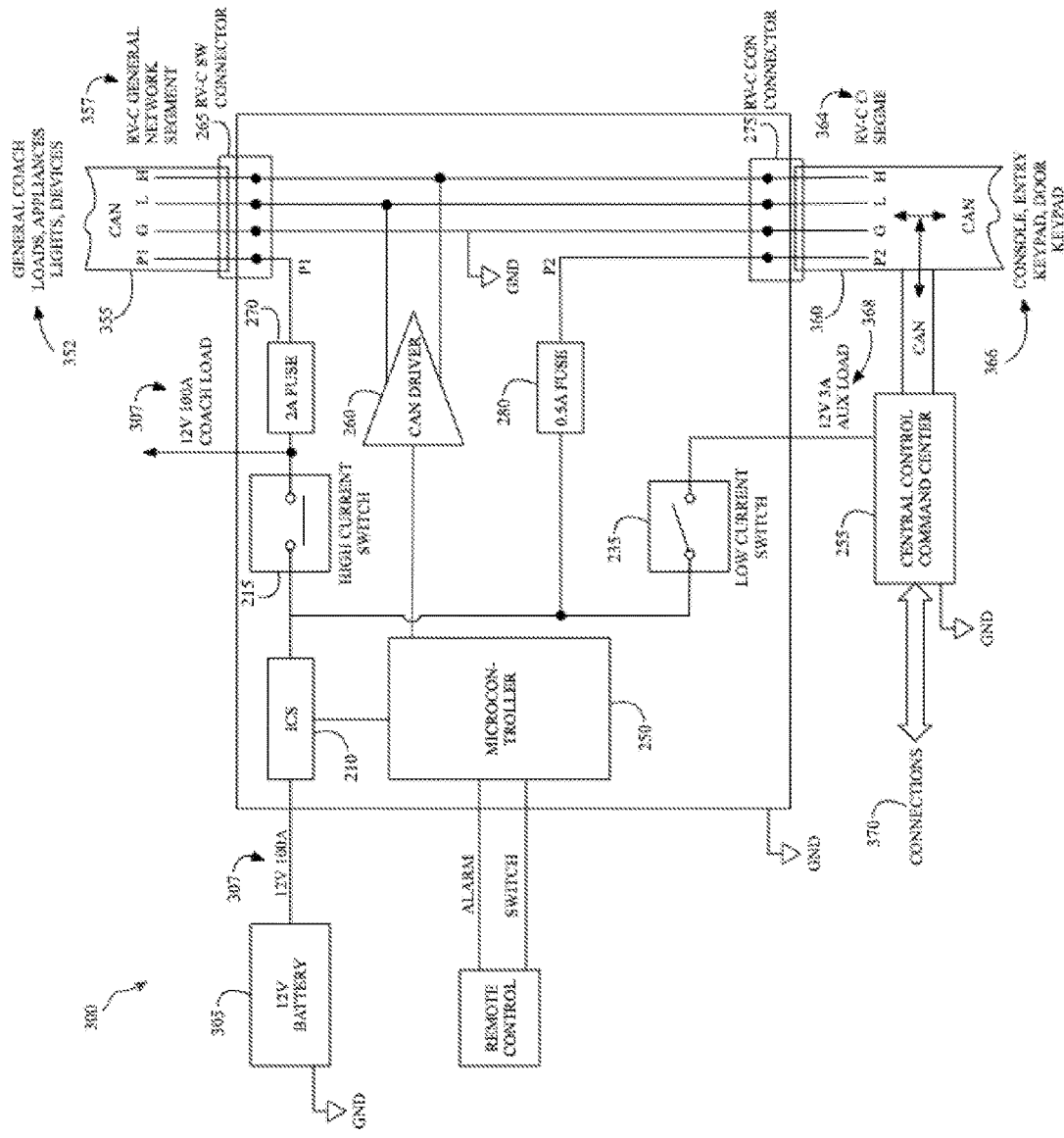
FIG. 3 is a schematic diagram illustrating the segmented CAN circuitry of the battery power management system, in accordance with an embodiment of the present invention.

With reference to FIG. 3, an exemplary DC power management system 300 in accordance with the present invention includes a network interface cabling having segmented power distribution. In this embodiment, the microcontroller 250 controls the segmented power distribution to provide power independently to at least two segments of the network interface cabling. In this embodiment, the network interface cabling is CAN, however this is not intended to be limiting and other network interface technologies are within the scope of the present invention.

In this exemplary embodiment, a 12V battery 305 provides a 12V, 100 A supply to an isolated current sensor (ICS) 210 to provide connection to a 12V, 110 A coach load 307 through a high current switch 215. Under control of the microcontroller 250, the CAN driver 260 then provides a first power (P1) to an RV-C general network segment 347 of a first segment of the CAN bus 355 through a 2 A fuse 270 and an RV-C SW connector 265. The RV-C general network segment 347 of the CAN bus thereby provides a first power to general coach loads, such as appliances, lights, coach devices, etc. 352.

Additionally, the battery 305 provides a 12V, 3 A supply to auxiliary load 368 under control of the microcontroller 250, the CAN driver 260 provides a second power (P2) to an RV-C console segment 364 of a second segment of the CAN bus 360 through a 0.5 A fuse 280 and an RV-C CON connector 275. The RV-C console segment 364 thereby provides a second power to the console entry keypad, door keypad, etc. 366. The auxiliary load, for example a central control command center 255, may additionally provide access for various additional connections 370 to the CAN bus 360.

Accordingly, the microcontroller 250 controls the segmented power distribution of the CAN bus to provide power independently to at least two segments of the network interface cabling. In particular, a first segment 355 comprising networked devices 352 may be powered by the at least one high current load switch 215, a second segment 360 comprising networked devices 366 may be powered by the at least one low current load switch 235. While this exemplary embodiment shows two segments, it is not intended to be limiting and additional segments, such as a third segment comprising networked devices powered independently of a state of the at least one high current load switch and the at least one low current load switch, is within the scope of the present invention.

As described above, the battery power management system addresses the problem of inadequate battery management for vehicles and vessels requiring switching devices to disconnect mounted batteries from unit loads. The battery power management system prevents over-discharging and over-charging of the batteries, prevents excessive current drain, provides timing parameters to coordinate connection and disconnection attempts and provides status information regarding the current state of protection of the batteries.

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

The invention claimed is:

1. A DC power management system, the system comprising:
   at least two load switches, each of the at least two load switches to connect one or more DC power sources to one or more loads and to disconnect the one or more DC power sources from the one or more loads, wherein the at least two load switches further includes at least one high current load switch having a high current capacity and at least one low current load switch having a low current capacity;
   a microcontroller in communication with the at least two load switches, the microcontroller to control the at least two load switches to connect or disconnect the one or more DC power sources to the one or more loads;
   at least one sensor interface of the microcontroller, the at least one sensor interface to receive one or more operating parameters of each of the one or more DC power sources;
   a memory unit for storing operating parameter threshold values for each of the one or more DC power sources; and
   the microcontroller to control the at least two load switches to connect the one or more DC power sources to the one or more loads and to disconnect the one or more DC power sources from the one or more loads based upon the one or more operating parameters of each of the one or more power sources received at the at least one sensor interface of the microcontroller and the operating parameter threshold values for each of the one or more DC power sources.

2. The DC power management system of claim 1, wherein the one or more DC power sources are selected from batteries, solar panels and fuel cells.

3. The DC power management system of claim 1, wherein the one or more operating parameters of each of the one or more DC power sources are selected from a measured voltage, a measured current, a measured temperature and a state of charge (SOC) of each of the DC power sources.

4. The DC power management system of claim 1, wherein the operating parameter threshold values are selected from voltage threshold values, current threshold values, temperature threshold values, timing threshold values and state of charge (SOC) threshold values.

5. The DC power management system of claim 1, wherein the microcontroller controls the at least two load switches using rules based logic.

6. The DC power management system of claim 1, wherein a low voltage threshold of the at least one high current load switch is higher than a low voltage threshold of the at least one low current load switch.

7. The DC power management system of claim 1, further comprising network interface circuitry in communication with network interface cabling coupled to a plurality of networked devices, the network interface cabling having segmented power distribution, wherein the microcontroller controls the segmented power distribution to provide power independently to at least two segments of the network interface cabling.

8. The DC power management system of claim 7, wherein the microcontroller controls the segmented power distribution to provide power to:
   a first segment comprising networked devices powered by the at least one high current load switch;
   a second segment comprising networked devices powered by the at least one low current load switch; and
   a third segment comprising networked devices powered independently of a state of the at least one high current load switch and the at least one low current load switch.

9. The DC power management system of claim 1, further comprising an isolation switch positioned between one or more of the at least two load switches.

10. The DC power management system of claim 1, wherein the microcontroller further comprises communication circuitry providing wireless and wired communication capabilities for the DC power management system.

11. A DC power management system, the system comprising:
   at least two load switches, each of the at least two load switches to connect one or more DC power sources to one or more loads and to disconnect the one or more DC power sources from the one or more loads, wherein the at least two load switches further includes at least one high current load switch having a high current capacity and at least one low current load switch having a low current capacity;

a microcontroller in communication with the at least two load switches, the microcontroller to control the at least two load switches to connect or disconnect the one or more DC power sources to the one or more loads;

at least one sensor interface of the microcontroller, the at least one sensor interface to receive one or more operating parameters of each of the one or more DC power sources;

a memory unit for storing operating parameter threshold values for each of the one or more DC power sources;

the microcontroller to control the at least two load switches to connect the one or more DC power sources to the one or more loads and to disconnect the one or more DC power sources from the one or more loads based upon the one or more operating parameters of each of the one or more power sources received at the at least one sensor interface of the microcontroller and the operating parameter threshold values for each of the one or more DC power sources; and network interface circuitry in communication with network interface cabling coupled to a plurality of networked devices, the network interface cabling having segmented power distribution, wherein the microcontroller controls the segmented power distribution to provide power independently to at least two segments of the network interface cabling.

12. A method for controlling one or more DC power sources, the method comprising:

coupling a DC power management system to at least two load switches, wherein the DC power management system comprises;

at least two load switches, each of the at least two load switches to connect one or more DC power sources to one or more loads and to disconnect the one or more DC power sources from the one or more loads, wherein the at least two load switches further includes at least one high current load switch having a high current capacity and at least one low current load switch having a low current capacity;

a microcontroller in communication with the at least two load switches, the microcontroller to control the at least two load switches to connect or disconnect the one or more DC power sources to the one or more loads;

at least one sensor interface of the microcontroller, the at least one sensor interface to receive one or more operating parameters of each of the one or more DC power sources;

a memory unit for storing operating parameter threshold values for each of the one or more DC power sources; and controlling, by the DC power management system, the at least two load switches to connect the one or more DC power sources to the one or more loads and to disconnect the one or more DC power sources from the one or more loads based upon the one or more operating parameters of each of the one or more power sources received at the at least one sensor interface of the microcontroller and the operating parameter threshold values for each of the one or more DC power sources.

13. The method of claim 12, wherein the one or more operating parameters of each of the one or more power sources are selected from a measured voltage, a measured current, a measured temperature and a state of charge (SOC) of each of the DC power sources and wherein the operating parameter threshold values are selected from voltage threshold values, current threshold values, temperature threshold values, timing threshold values and state of charge (SOC) threshold values.

14. The method of claim 12, further comprising, the microcontroller controlling the at least two load switches using rules based logic.

15. The method of claim 12, wherein the method includes controlling the high current load switch based upon a low voltage threshold of the at least one high current load switch that is higher than a low voltage threshold of the at least one low current load switch.

16. The method of claim 12, further comprising network interface circuitry in communication with network interface cabling coupled to a plurality of networked devices, the network interface cabling having segmented power distribution, wherein the microcontroller controls the segmented power distribution to provide power independently to at least two segments of the network interface cabling.

17. The method of claim 16, wherein the microcontroller controls the segmented power distribution to:

provide power to a first segment comprising networked devices powered by the at least one high current load switch;

provide power to a second segment comprising networked devices powered by the at least one low current load switch; and provide power to a third segment comprising networked devices powered independently of a state of the at least one high current load switch and the at least one low current load switch.

18. The method of claim 12, wherein the microcontroller further comprises communication circuitry providing wireless and wired communication capabilities for the DC power management system.

19. The method of claim 12, wherein the microcontroller further provides interlocking switching functionality based upon the operating parameters, operating parameter threshold values and rules based logic.

* * * * *